United States Patent
Hanson et al.

[11] 3,823,372
[45] July 9, 1974

[54] METHOD AND APPARATUS FOR MEASURING THE TOTAL SURFACE AREA CONCENTRATION OF PARTICLES ENTRAINED IN A GAS

[75] Inventors: Donald N. Hanson, Orinda; Alexis T. Bell, Oakland, both of Calif.

[73] Assignee: The Regents of the University of California, Berkely, Calif.

[22] Filed: Nov. 6, 1972

[21] Appl. No.: 304,017

[52] U.S. Cl. ............. 324/71 R, 324/33, 324/71 CP, 73/432 PS
[51] Int. Cl. .................... G01n 27/70, G01n 15/00
[58] Field of Search ............... 324/71 CP, 71 R, 33; 73/28, 23, 194 F, 432 PS

[56] References Cited
UNITED STATES PATENTS
| | | | |
|---|---|---|---|
| 2,932,966 | 4/1960 | Grindell | 324/33 |
| 3,058,057 | 10/1962 | Frost | 324/33 |
| 3,114,877 | 12/1963 | Dunham | 324/33 |

OTHER PUBLICATIONS

Gilmore Sem, "Electro Static Measurement Methods," Instrumentation for Measurement of Particulate Emissions from Combustion Services, Vol. II, pp. 113–137, No. CTA–23, 1971.

Werner and Geromime, "Investigation of a Corna Discharge for Measurements in Air Flow," 1952, TL574F5M5.

*Primary Examiner*—Alfred E. Smith
*Assistant Examiner*—Rolf Hille
*Attorney, Agent, or Firm*—Owen, Wickersham & Erickson

[57] ABSTRACT

The total surface area concentration of particles entrained in a gas is determined by measuring the original and residual currents resulting from a low-intensity gaseous ion source operating in a space through which the particle-laden gas is flowed. A short corona discharge is a typical example of such a source. The measurement is independent of current and does not require knowledge of particle size distribution.

15 Claims, 3 Drawing Figures

PATENTED JUL 9 1974    3,823,372
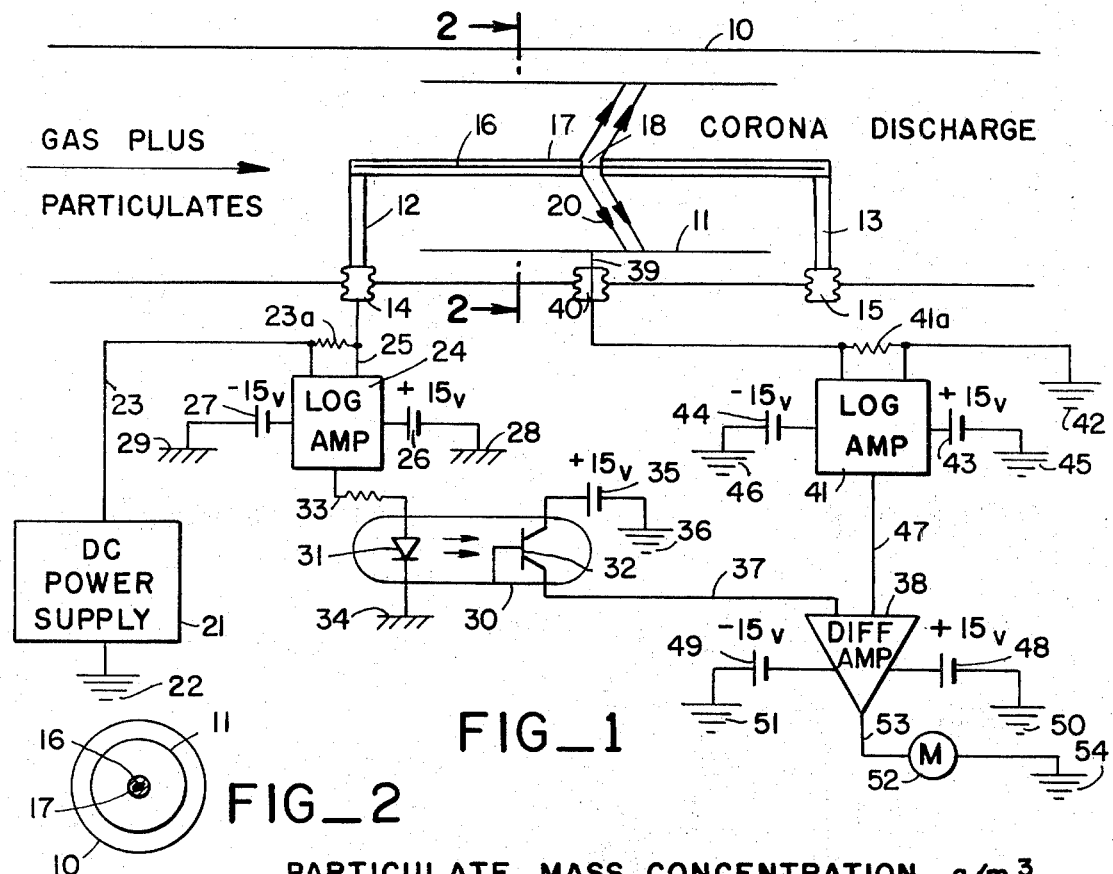
FIG_1
FIG_2
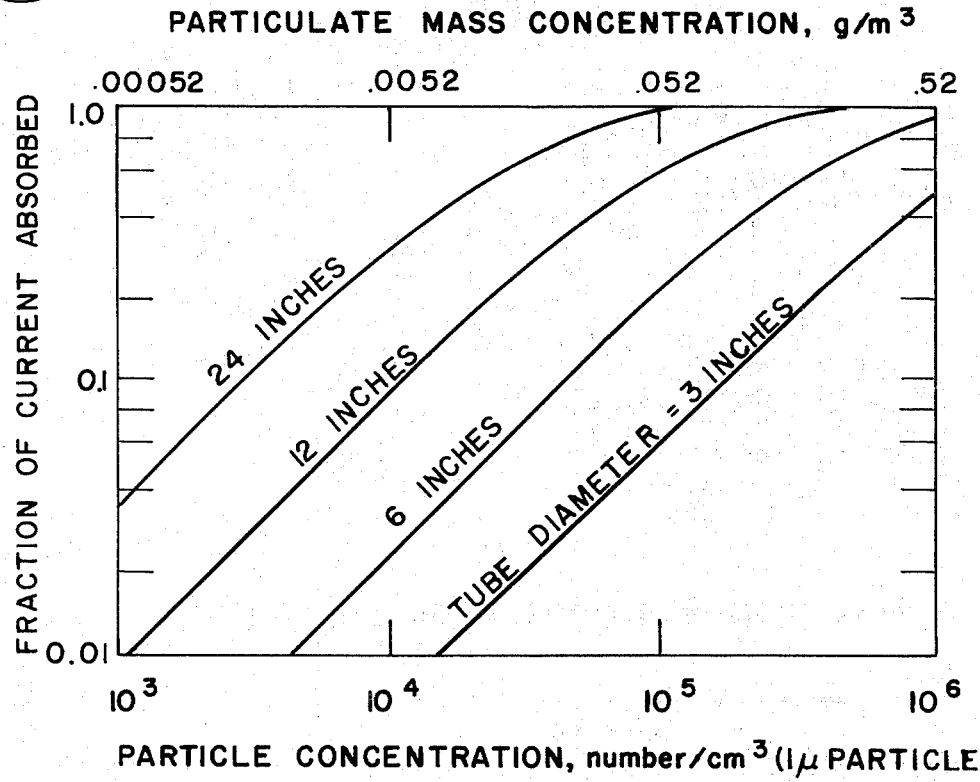
FIG_3

METHOD AND APPARATUS FOR MEASURING THE TOTAL SURFACE AREA CONCENTRATION OF PARTICLES ENTRAINED IN A GAS

BACKGROUND OF THE INVENTION

The measurement of any quantity describing the particulates in a gas-particulate system is of great importance in the technology of air pollution. The total surface area of the particulates is one of the quantities of special interest because the visual character of a gaseous effluent is determined by the surface area of the particulates. Furthermore, a measure of surface area coupled with a measure of mass or a particle count can provide a complete description of the particulates in the system.

Such measurements can, for example, by used to monitor smokestacks for factories, public utilities, apartments, and public and office buildings. They can be used in monitoring automobile engine exhaust pollution, to monitor the atmosphere in a mine or an industrial area, or in the general atmosphere, to detect air pollution. They can be used to measure the existence and density of fog.

Previous studies have shown that the phenomenon of particulate charging by gaseous ions can be used as a means for measuring the total particulate surface area. Grindell (in I.E.E. Paper No. 31845, Volume 107A, page 353, January 1960 and in AEI Eng. Volume 2, page 229, 1962 and in U.S. Pat. No. 2,932,966) has made use of the fact that a particle will reach a saturation charge if the charging mechanism is bombardment charging. At saturation, the charge on the particles is proportional to particle surface area. In Grindell's device the gas carrying particulates is passed through a corona of sufficient length that the particles reach a saturation charge. Downstream from the corona, the charged particles are collected by appropriate fields, and the current released by the particles is recorded in order to give a measure of total particle surface area. This device has been demonstrated to work, and an improvement upon it has been developed by Dunham, U.S. Pat. No. 3,144,877.

However, several features of the devices of Grindell and Dunham make them difficult to use and impose limitations on their general applicability. The first point is that the devices depend on saturation charging. This effect will occur when bombardment charging dominates over diffusion charging, which would hold for particles several microns or more in diameter, but smaller particles would not reach a saturation charge. Consequently, if the particulate size distribution were to contain a sizeable fraction below a micron or so, the collected current would no longer be proportional to surface area. Secondly, the collection of stray ions by the particle detector could lead to an erroneous reading. Thirdly, it can be shown both theoretically and experimentally that the collected current depends on the corona current. Since changes in the corona current could occur due to variations in the corona voltage or the gas composition, these effects could cause a change in collected current which is not associated with the particulate content of the gas.

SUMMARY OF THE INVENTION

The present invention for measuring total particulate area utilizes the phenomenon of particle charging by gaseous ions but avoids the difficulties inherent in the instruments described by Grindell and Dunham. A low-intensity gaseous ion current is generated at a first electrode and a potential is applied between that electrode and a second collecting electrode, so that the current passes between the two electrodes. The source of current may be a corona discharge, or thermionic or photoelectric emission. The gaseous suspension of particulates is flowed through the space between the electrodes, thereby placing a small charge on a small fraction only of the particulates. The generated current and the current arriving at the second electrode are both measured, and, by applying mathematical analysis appropriate to the geometry of the electrode system to those current measurements, the desired particle surface area concentration can be determined. This analysis may be applied mathematically.

One way of carrying out the principles of the invention is to suspend an insulated wire along the axis of a cylindrical metal tube. A short gap in the wire's insulation is provided, and a voltage of several kilovolts is applied to the wire, causing a thin disc-shaped corona to be formed at the axial position where the insulation has been removed from the wire. A sample of the gas to be analyzed is circulated through the cylindrical tube, causing the particles to pass through the corona. This results in placing a small charge on the particles and produces a reduction in the amount of current reaching the tube. If the gas flow is moderately fast, essentially no precipitation of the particles will take place, but the high mobility of the gaseous ions leaves the ion current reaching the tube unaffected by the flow. As will be shown in the following section on theory in this particular configuration, the logarithm of the ratio of the current leaving the corona to the ion current collected at the tube is proportional to the total particle surface area concentration flowing with the gas.

MATHEMATICAL ANALYSIS FOR A PREFERRED FORM OF THE INVENTION

Differences in geometry and the geometrical relationships between the electrodes and similar factors lead to differences in the mathematical analysis. Some analyses are relatively easy to work out, and some are rather difficult. By way of example, the mathematical analysis for a preferred form of the invention—where a thin corona discharge flows from a short uninsulated portion of an axial wire to a cylindrical tube—is here presented. The approach to other analyses for other geometries will become apparent by considering the approach here.

Consider the corona to be a thin annular disc contained between the radii $r = a$ and $r = b$. The steady state expression for conservation of charge is given by $$-\overline{\nabla}\cdot\overline{N}_i - Q_i = 0 \qquad (1)$$

where $\overline{N}_i$ = ion flux, coulombs/sec·$m^2$ $Q_i$ = rate of disappearance of ions by particle charging, coulombs/$m^3$·sec The ion flux can be related to the ion concentration by the ion mobility and the local electric field.

$$\overline{N}_i = e\lambda_i \overline{E} c_i \qquad (2)$$

where $e$ = electronic charge, coulombs $\lambda_i$ = ion mobility, $m^2$/volt·sec $\bar{E}$ = field, volts/$m$
$c_i$ = ion concentration, number/$m^3$ The flux, $\bar{N}_i$, and the fields, $\bar{E}$, are vector quantities. However, if the wire and tube arrangement extends in both axial directions well beyond the cross section in which the corona is operating, and if the ion density is low, the radial fields will be the same everywhere near the corona, and axial fields will be zero. Also although the gas flow transports the ion current in the axial direction, the ions experience the same fields at all axial positions and the radial flux can be analyzed without regard to axial position. $\bar{N}_i$ will therefore be taken as the radial flux and $\bar{E}$ as the radial field.

Charging of the particles proceeds by two well-established and experimentally verified mechanisms, bombardment charging and diffusion charging. The rate of charging by the two mechanisms is given by White in Industrial Electrostatic Precipitation, Addison-Wesley, Reading, Mass., 1963:

Bombardment charging is:

$$\frac{dq}{dt} = \frac{c_i e \lambda_i}{4\epsilon_o} \left[ q_s \left( 1 - \frac{q}{q_s} \right)^2 \right] \quad (3)$$

Diffusion charging is:

$$\frac{dq}{dt} = \frac{e\pi d_p^2 \bar{c} c_i}{4} \exp\left[ \frac{-qF}{2\pi\epsilon_o d_p RT} \right] \quad (4)$$

where $q$ = particle charge, coulombs
$t$ = time, seconds
$\epsilon_o$ = permittivity of free space, coulombs/volt·$m$
$q_s = 3\pi\epsilon_o E d_p^2$ = saturation particle charge, coulombs $d_p$ = particle diameter, meters
$\bar{c}$ = average thermal velocity of ions, $m$/sec
F = Faraday = 96,500 coul/gm ion
R = gas constant = 8.312 joules/gm ion·°K
T = temperature, °K For preliminary examination of the operation of the device, consider that the residence time of the particles is sufficiently small that the rate of charging is the initial rate for uncharged particles. Under this assumption $q = 0$.

Taking both charging mechanisms into account $$\frac{dq}{dt} = \frac{c_i e \lambda_i}{4\epsilon_o} (3\pi\epsilon_o E d_p^2) + \frac{e\pi d_p^2 \bar{c} c_i}{4} \quad (5)$$

and for a particle concentration of $c_p$ $$Q_i = \frac{3\pi e}{4} c_p d_p^2 c_i \lambda_i E + \frac{\pi e}{4} c_p d_p^2 \bar{c} c_i \quad (6)$$

Equation (6) can be reexpressed in terms of the ion flux to give $$Q_i = \frac{3\pi}{4} c_p d_p^2 N_i + \frac{\pi}{4} c_p d_p^2 \frac{\bar{c}}{\lambda_i E} N_i \quad (7)$$

The electric field in the gap between the wire and the cylinder will depend on the applied voltage and the charge density in the corona. If the corona is operated just above its threshold such that the corona current is very low, the electric field can be closely approximated by the zero-current relationship $$E = (V/r \log_e b/a,) \quad (8)$$

where V = voltage and
$r$ = radius at which E exists

Substitution of Equations (7) and (8) into Equation (1) gives $$-\nabla \cdot \bar{N}_i = \frac{3\pi}{4} c_p d_p^2 N_i + \frac{\pi}{4} c_p d_p^2 \frac{\bar{c} r \log_e b/a}{V \lambda_i} N_i \quad (9)$$

Expanding the divergence of the radial flux:

$$\frac{dN_i}{dr} + \frac{N_i}{r} = -\frac{\pi}{4} c_p d_p^2 \left( 3 + \frac{\bar{c} r \log_e b/a}{V \lambda_i} \right) N_i \quad (10)$$

Equation (10) can be rearranged to give $$d \log_e N_i = -\frac{\pi}{4} c_p d_p^2 \left( 3 + \frac{\bar{c} r \log_e b/a}{V \lambda_i} \right) dr - d \log_e r \quad (11)$$

Equation (11) can now be integrated from the wire radius a to the tube radius b yielding $$\log_e \frac{(N_i)_b}{(N_i)_a} = -\frac{\pi}{4} c_p d_p^2 \left[ 3 + \frac{\bar{c} \log_e b/a}{2\lambda_i V} (b+a) \right] (b-a) - \log_e b/a \quad (12)$$

Expressing the flux in terms of I, the ion current per unit length, $$I = N_i 2\pi r$$

$$\log_e \frac{I_b}{I_a} = -\frac{\pi}{4} c_p d_p^2 \left[ 3 + \frac{\bar{c} \log_e b/a}{2\lambda_i V} (b+a) \right] (b-a) \quad (13)$$

The total area of the particles per unit volume, A, can now be solved for:

$$A = \pi c_p d_p^2 = 4 \log_e \frac{I_a}{I_b} \div \left[ 3 + \frac{\bar{c} \log_e b/a}{2\lambda_i V} (b+a) \right] (b-a) \quad (14)$$

The divisor on the right hand side of the equation is made up of relations between $a$ and $b$, which are constants, V which is kept constant, $\bar{c}$ which is a constant at any given temperature, and $\lambda_i$, also a constant at any given temperature. This, for a given device the entire term can be represented as $K_t$, a constant whose value depends only on the temperature; consequently, A can be expressed as $$A = (4/K_t) \log_e (I_a/I_b) \quad (15)$$

The general features shown by Equations (14) and (15) should be noted. The logarithm of the ratio of the two currents is proportional to the total surface area concentration of the particulate matter. If a distribution of particle sizes exists, the term $c_p d_p^2$ simply becomes the sum of all such terms for the various particle sizes and there is no other dependence on particle size. Also, the fractional reduction in current is independent of the magnitude of the current, so that no control of the current is required. The device can be readily operated by using a variable D.C. power source and raising the voltage applied to the wire to just beyond the corona onset potential. The exact level of the voltage is unimportant. Ripple in the applied voltage is also unimportant if the phase lag between the two currents is adjusted for in the circuitry.

The equations have, of course, been derived for spherical particulates. The effect of other particulate shapes on the charging relations has not been determined, but it might be expected that the form of the equations would be the same for all shapes and that only a correction factor on each of the charging laws would be required. Also, if the dielectric constant of the material is known, the small correction to bombardment charging for dielectric constant could be easily applied.

One other point must be considered. The equations have been derived under the stipulation that the charging rate throughout the period of charging is the rate corresponding to zero particle charge. If the amount of charge placed on any particle is small, this requirement will be satisfied. The best means of insuring this is to charge for such a short time that only a small fraction of the particles acquire even a single electronic charge. In the calculations shown below, the charging time was set to provide a single electronic charge on every tenth particle. The chance of a particle achieving two charges is then of the order of one percent, and any error due to deviation from the zero charge rate is of the same order.

The charging times required are generally of the order of a fraction of a millisecond, and the corona length at reasonable velocities is a fraction of a millimeter. The current at the wire is of the order of $10^{-9}$ or $10^{-10}$ amps. None of these quantities is critical, however, and a single meter could be constructed to accurately measure over two orders of magnitude in particle concentrations or more.

BRIEF DESCRIPTION OF THE DRAWINGS

FIG. 1 is partly a pictorial view in side elevation and partly in section and partly a circuit diagram of an apparatus embodying the principles of the invention.

FIG. 2 is a view in section taken along the line 2—2 in FIG. 1.

FIG. 3 is a graph showing the fraction of current absorbed by tubes of different diameters, plotting particle concentration versus fraction of current absorbed.

DESCRIPTION OF A PREFERRED EMBODIMENT

A gas containing particles flows through a conduit 10. The gas may have its own flow source (a smokestack, automobile exhaust, etc.) or there may be a fan (not shown). A tubular collecting electrode 11, preferably circular, is positioned in the flow path. There are two posts 12 and 13, the post 12 being electrically conductive and insulated from the conduit 10 by an insulator 14, while the post 13 may or may not have an insulator 15, depending on whether or not the post 13 is electrically conductive. These posts 12 and 13 support a wire 16 which is covered with insulation 17 except at a narrow gap 18 typically about one millimeter wide. The wire 16 is set axially and concentrically in the cylindrical collecting electrode 11. This results in a thin, disc-like corona discharge 20 between the uninsulated portion of the wire 16 and the collecting electrode 11 when a sufficient voltage is applied.

A D.C. power source 21 has one side grounded at 22 and is connected by a lead 23 to a logarithmic amplifier 24, which lies across a resistor 23a, across which a potential is developed. A lead 25 connects the logarithmic amplifier 24 to the electrically conductive post 12 and therefore to the wire 16, which is located along the axis of the tubular electrode 11.

A +15 volts is applied to the logarithmic amplifier 24 by a battery 26, and a −15 volts is applied to the amplifier 24 by a battery 27. Both batteries 26 and 27 are grounded to the chassis for the amplifier 24 at loci 28 and 29. A photo-coupler 30 composed of a photo-diode 31 and a photo-transistor 32 is connected to the logarithmic amplifier 24 by a lead 33, which carries a current which is proportional to the natural logarithm of the current flowing to the wire 16. After passing through the photo-diode 31 the current from the logarithmic amplifier 24 is sent to a chassis ground at point 34. The light generated by the photo-diode 31 is received by the photo-transistor 32, which, in turn, sends out a signal proportional to that passing through the photo-diode 31. By this means it is possible to isolate the measurement of the corona current from the high voltage which sustains the corona.

The photo-transistor 32 is driven by a +15 volt D.C. source 35 grounded to true ground at 36. A lead 37 carries the current from the photo-transistor 32 to a differential amplifier 38.

Current from the cylindrical electrode 11 is collected by a lead 39, passes through an insulator 40 in the wall of the conduit 10 whence it goes to a second logarithmic amplifier 41, which is in parallel with a resistor 41a across which a potential is developed, having a true ground 42. Batteries 43 and 44 are grounded to true ground at 45 and 46 and supply voltages, respectively, of +15 volts and −15 volts to the logarithmic amplifier 41. A lead 47 conducts a current representing the logarithm of the current passing through the lead 39, to the differential amplifier 38. Two sources 48 and 49 of direct current, truly grounded at 50 and 51, provide respective voltages of +15 volts and −15 volts to the differential amplifier 38.

The differential amplifier 38 sends to a microammeter 52 by a lead 53, a current representing the difference of the two logarithms. Thus, if a current $i_1$ is flowing to the wire 16 and a smaller current $i_2$ is flowing from the electrode 11, the differential amplifier feeds a current $k(\log i_1 - \log i_2)$ through the microammeter 52 to ground 54, $k$ being a proportionality factor relating the difference between $\log i_1$ and $\log i_2$ to the particulate surface area concentration, thereby multiplying the difference by this factor, which is dependent upon the dimensions of the tubular zone and upon other measurements that are constant in each particular system employing this method at a given temperature. The scale on the microammeter 52 and the gain on the amplifier 38 enable direct reading of a desired value.

In a typical device the diameter of the wire 16 might be 0.020 inch and the potential difference necessary to operate the corona discharge may be 14,000 volts, although a wide latitude of choices is permissible. The preferred diameter of the collecting tube 11 would be determined by the average particle size and concentration of particulate matter in the gas stream to be measured. Thus, considering particles of 1 micron diameter, FIG. 3 shows the fraction of current absorbed for various collecting tube diameters and various particle concentrations. The preferred tube diameter would be selected to yield a fraction of current absorbed which is readily and accurately determined by the measuring circuit. Such a fractional value might be 0.10 and it is apparent from FIG. 3 that concentration levels may vary almost by two orders of magnitude from the design value, and yet accurate reading of the total particulate surface area is possible.

As an example, consider a particulate system of one-micron particles in a wire-and-tube assembly, in which the wire 16 has a diameter of 0.020 inch. At ordinary temperature and pressure, typical values of the parameters would be $\bar{c} = 470$ m/sec $\lambda_i = 2.2 \times 10^{-4}$ $m^2$/volt · sec V = 10,000 to 15,000 volts, depending on tube diameter. Using these values, the fraction of current absorbed has been calculated for various tube diameters and particle concentrations, as shown in FIG. 3. It is apparent that successful and accurate measurements could be readily made for particle concentrations from $10^3/cm^3$ to $10^6/cm^3$ or from mass concentrations covering the range from average atmospheric pollution to rather dense smokes. In calculating the mass a density of 1 $gm/cm^3$ was assumed.

The same general conclusions can be drawn for other particle sizes. For the same mass loading, smaller particles are easier to measure in that they yield a higher fraction of current absorbed.

The preferred length of the corona would be given by a compromise between the current desired and the gas flow rate provided. As the gas flow rate is increased, a longer corona is possible, thus raising the current read by the meters. The corona should, however, still be short enough that no substantial charging of the particles takes place. The analysis of the results is most precise when the charging of the particles is small. Longer corona discharges at a given gas flow rate will yield higher particle charging but more readily measured currents. Similarly, at a given current, higher gas flows will yield more accurate determinations of particle concentration since the particle charging is lessened. For the example of 1 micron particles, desirable values of gas flow rate appear to be of the order of 10 ft/sec, corona currents of the order of $10^{-9}$ amperes, and corona length of the order of a fraction of a millimeter.

However, wide variations in the dimensions and amounts specified above are permissible consistent with successful and accurate measurement of particle concentration. Optimum values of corona length, corona current, wire diameter, and tube diameter would normally be determined for each particulate system to be measured.

In smokestack monitoring current standards are based on plume opacity which is basically a function of the particulate area as well as the depth of the plume. The output through the lead 53 will directly correlate with plume opacity, and size distribtuion errors will not cause measurement errors. In this application there are very large advantages of the approach of the present invention relative to approaches by optical methods, for in situ monitoring and emission control.

Potential instruments using the concept of this invention have been considered in a preliminary evaluation. Some of these are as follows:

1. Stack Monitor:

Since the apparatus of this invention is fundamentally a straight section of pipe, it can be easily inserted into smoke stacks to isokinetically sample the effluent. Several such sections can be distributed across the stack radius to obtain the distribution function if desired. As an alternate approach, especially where the expected particle concentration is low, the entire stack diameter may be utilized as the instrument. In any case, the concept lends itself to operation within the stack itself through the use of high temperature, non-corrosive materials. Reliable, accurate measurements over long periods of time are possible without maintenance.

2. Auto Exhaust Monitor:

Automobile engine particulate emissions can be monitored easily by placing a straight through pipe section incorporating the instrument of this invention at the exhaust pipe exit. The extreme simplicity of the invention and the low cost of its components are features which point toward a mass-produced instrument for exhaust monitoring at the service station level. The nature of the instrument also permits it to be attached to the exhaust pipe and emissions monitored in real time while driving under different conditions.

3. Industrial or Mine Atmosphere Monitor:

One of several low cost integrator approaches may be combined with the apparatus of this invention to provide the product of concentration and time as an additional readout. In this manner the physiological burden received by personnel exposed to the atmosphere being monitored will be indicated. (This is directly equivalent to present samplers which measure the total mass of particles deposited on a filter over a specified time interval.) Outputs corresponding to instantaneous dust concentration levels are also available at the instrument and will be useful in surveying dust hazards as well as providing a basis for effective dust control measures. For the latter purpose the integrator function is not needed, and a very simple hand held instrument may be used to enable supervisor personnel to select the most appropriate control measures since they will have instant feedback as to the effectiveness of such measures.

The extremely low power level of the instrument (the corona draws less than 10 microwatts) is expected to enable power source energy limitations to remain low enough for "intrinsically safe" operation in hazardous environments. In addition, the low power feature of the device permits long battery life in a portable unit.

4. Fog Measurement:

The straight-through feature of the device of this invention enables reasonably accurate isokinetic sampling to be accomplished. Scientific studies and certain safety problems may be solved through its use to monitor the existence and density of fog. Its low power characteristic combined with its ability to operate for long periods without attention make the device an attractive approach for remote station monitoring of fog or other airborne particulates. Fog can be effectively separated from other particulates by prewarming the air entering the unit at intervals to establish baseline particulate levels.

5. Air Pollution Monitor:

Especially in unattended operating conditions the device of this invention provides a useful means of monitoring the atmospheric burden of particulate matter for policing, survey and alarm purposes. In fixed installation operation extremely high sensitivity to low particulate concentration can be achieved through the use of large outside tube diameters. Since the outside tube is only a sheet metal structure, relatively large systems can be fabricated at costs only slightly larger than for smaller, hand held units.

In the preceding section dealing with theoretical aspects of the invention it was shown that an instrument may comprise only a straight tube 11, an axially supported wire 16, a power supply 21, and a readout circuit. Depending on the application and sensitivity range desired, the dimensions will vary, but no critical tolerances or fabrication techniques are required. In some applications a blower (fan) will be necessary to move the air through the tube. High flow velocities are not necessary, and the actual velocity may vary over a wide range without affecting instrument accuracy or performance. Special applications may require the use of particle size selection.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A method for determining the concentration of total surface area of particles entrained in a gas, comprising generating a low-intensity gaseous ion current at a first electrode, applying a potential between said first electrode and a second collecting electrode so that said current passes between said electrodes, while constraining the current to a narrow plane-like section, flowing a gaseous suspension of particulates through the space between said electrodes at such a velocity that only a small charge well below saturation is placed on a fraction of said particulates, and measuring both the generated current and the total current not absorbed by said particulates and arriving at the collecting electrode, so that, from the values thereby obtained mathematical analysis appropriate to the geometry of the electrode system may be applied to express said concentration.

2. A method for determining the concentration of total surface area of particles entrained in a gas, comprising flowing a gaseous suspension of particulates through a narrow plane-like zone of low-intensity current, at such a velocity as to cause a small proportion of said particulates to pick up charge from said current, and measuring both the original low-intensity current and the total residual current not absorbed by said particulates, wherefrom sid concentration can be calculated.

3. A method for measuring the concentration of total surface area of particles entrained in a gas, comprising generating a low-intensity gaseous ion current at a first electrode, applying a potential between said first electrode and a second collecting electrode so that said current passes between said electrodes, while constraining the current to a narrow plane-like section, flowing a gaseous suspension of particulates through the space between said electrodes at such a velocity that only a small charge well below saturation is placed on only a small fraction of said particulates, measuring both the generated current and the total current not absorbed by said particulates and arriving at the collecting electrode, and electrically applying mathematical analysis appropriate to the geometry of the electrode system to these current measurements to express said concentration.

4. A method for measuring the concentration of total surface area of particles entrained in a gas, comprising flowing at least a proportion of said gas through a confined zone of known geometric configuration and size, causing a low-intensity plane-like corona discharge current to emanate from a first location in said zone and to flow to a second location in said zone, said flowing being at such a velocity whereby some of said particles acquire a small charge well below saturation, and measuring both the original corona discharge current at said first location and the total residual current arriving at said second location, whereby mathematical analysis appropriate to the geometry of the discharge system can be applied to express said concentration.

5. The method of claim 4 wherein said mathematical analysis is applied electrically to give the concentration directly.

6. A method for measuring the concentration of total surface area of particles entrained in a gas, comprising flowing at least a proportion of said gas through a confined cylindrical tubular zone, causing a thin disc-like corona discharge to emanate from the axis of said zone and to migrate to its boundaries, said flowing being at such a velocity that only a small proportion of said particles receive a small charge well below saturation, measuring the current fed to the axis of the zone and the current not absorbed by said particles in said corona discharge, subtracting the natural logarithm of the residual current from the natural logarithm of the current supplied to said axis in order to cause said corona discharge, and multiplying the difference by a factor that is dependent upon the dimensions of the tubular zone and upon other measurements that are constant in each particular system employing this method at a given temperature.

7. The method of claim 6 wherein the total surface area concentration A of the particles entrained in the gas flowed through the tubular zone is determined by the equation $$A = 4 \log_e \frac{I_a}{I_b} \div \left[ 3 + \frac{\bar{c} \log_e b/a}{2\lambda_i V}(b+a) \right](b-a)$$

where $I_a$ = the current fed to the axis of the zone
$I_b$ = the current not absorbed by the particles
$\bar{c}$ = average thermal velocity of ions
$a$ = the radius of the axial area whence the corona discharge emanates
$b$ = the radius of the tubular zone
$\lambda_i$ = ion mobility V = the voltage of the applied current.

8. Apparatus for determining the concentration of total surface area of particles entrained in a gas, including in combination:
a first electrode,
means for generating a plane-like low-intensity gaseous ion current at said first electrode,
a second collecting electrode spaced from said first electrode,
means for applying a potential between said first electrode and said second electrode, so that current passes between them in a narrow confined zone,
means for flowing a gaseous suspension of particulates through the space between said electrodes at such a velocity as to place a small charge on a fraction of said particulates,
means for measuring the generated current, and
means for measuring the total current not absorbed by sad particulates and arriving at said second electrode, whereby from the values thereby obtained, said concentration can be determined.

9. The apparatus of claim 8 having means for electrically applying mathematical analysis to the current values obtained by said means for measurement and for expressing said concentration.

10. Apparatus for determining the concentration of total surface area of particles entrained in a gas, including in combination:
means for flowing a gaseous suspension of particulates through a low-intensity current,
means for causing a small proportion of said particulates to pick up charges of a magnitude well below charge saturation from said current, and
means for measuring both the original low-intensity current and the total residual current not absorbed by said particulates.

11. Apparatus for measuring the concentration of total surface area of particles entrained in a gas, comprising
means for flowing at least a proportion of said gas through a confined zone of known geometric configuration and size,
means for causing a low-intensity plane-like corona discharge current to emanate from a first location in said zone and to flow to a second location in said zone, whereby some of said particles acquire a charge at a magnitude well below saturation, and
means for measuring both the original corona discharge current at said first location and the total residual current arriving at said second location.

12. The apparatus of claim 11 having means for electrically applying mathematical analysis to the measured currents for directly expressing said concentration.

13. Apparatus for measuring the total surface area of particles entrained in a gas, comprising
a conductive cylindrical tube,
means for flowing a known proportion of said gas through said tube,
a conductive wire extending along the axis of said tube covered with insulation except for a narrow gap,
means for supplying electrical current to said wire at a voltage sufficient to cause a narrow corona discharge to emanate from said wire at said gap and to flow to said tube, said gas flowing through said tube at such a velocity that a small fraction of said particles receive only a unit charge,
means for measuring the current supplied to said wire and the current not absorbed from said corona discharge by said particles and for expressing these currents in terms of the natural logarithms of their values,
means for subtracting the natural logarithm of said current not absorbed from the natural logarithm of the current supplied to the wire to cause said corona discharge and for multiplying the resulting difference in natural logarithms by a factor that is dependent upon the dimensions of the tubular zone and upon other measurements that are constant in each particular measuring apparatus of this invention at a set temperature, and
means for indicating the resultant product.

14. The apparatus of claim 13 wherein the constant measurements are:
$a$ = the radius of said wire,
$b$ = the outer radius of said tube,
$\bar{c}$ = the average thermal velocity of ions in the gas,
$\lambda_i$ = ion mobility, and
$V$ = the voltage of the applied current, and wherein said means for multiplying comprises electrical means for applying the following formula $$A = 4 \log_e \frac{I_a}{I_b} \div \left[ 3 + \frac{\bar{c} \log_e b/a}{2\lambda_i V} (b+a) \right] (b-a)$$

$I_a$ = the current supplied to the wire,
$I_b$ = the current not absorbed by the particles but reaching the outer boundary of the tubular zone,
$A$ = the total surface area concentration of said particles.

15. A method for measuring the concentration of total surface area of particles entrained in a gas, comprising
flowing at least a proportion of said gas through a confined cylindrical tubular zone,
causing a thin disc-like corona discharge to emanate from the axis of said zone and to migrate to its boundaries, said flowing being at such a velocity that only a small charge well below saturation is imparted to a fraction of said particle, and
measuring the current fed to the axis of the zone and the total current not absorbed by said particles in said corona discharge.

* * * * *